June 29, 1954  J. A. SENN  2,682,203
MACHINE TOOL MICROFEED
Filed Jan. 24, 1949  2 Sheets-Sheet 1
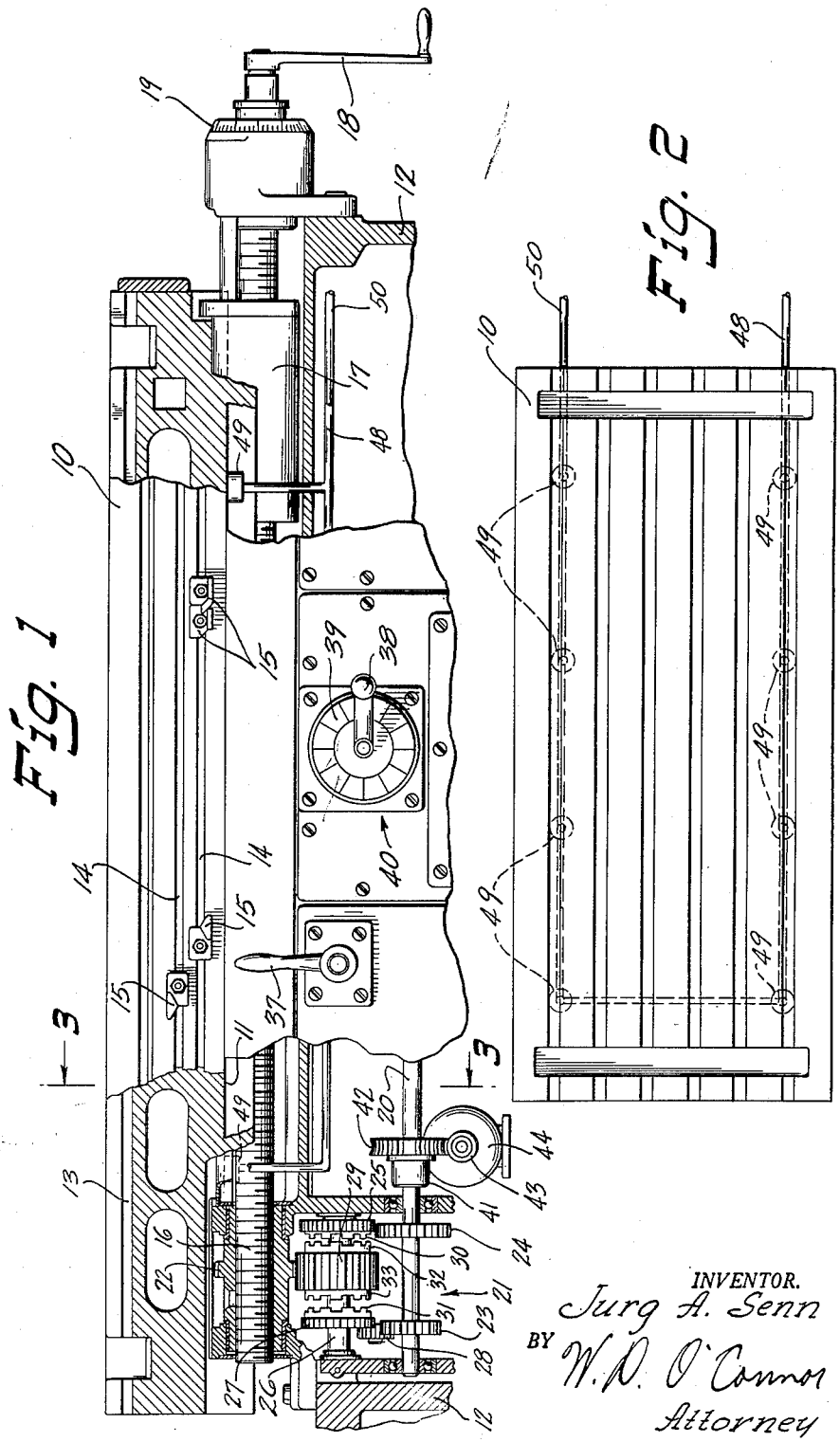
INVENTOR.
Jurg A. Senn
BY W. D. O'Connor
Attorney June 29, 1954  J. A. SENN  2,682,203
MACHINE TOOL MICROFEED
Filed Jan. 24, 1949                    2 Sheets-Sheet 2

INVENTOR.
Jurg A. Senn
BY W. D. O'Connor
Attorney

UNITED STATES PATENT OFFICE 2,682,203

MACHINE TOOL MICROFEED

Jurg A. Senn, Milwaukee, Wis., assignor to Kearney & Trecker Corporation, West Allis, Wis., a corporation of Wisconsin Application January 24, 1949, Serial No. 72,398

7 Claims. (Cl. 90—21)

This invention relates generally to improvements in power feeding mechanism for movable elements of machine tools and more particularly to an improved mechanism for effecting "inching" movements of a heavy machine element to make microadjustments of its position.

In accurately positioning a movable element of a machine tool, it is the general practice to move the element by power at a feed or rapid traverse rate until it arrives at a location just short of the desired final position. The movable element is then "inched" along to the final position by momentarily closing the power switch to move it a short distance at a time. This method is not satisfactory for making extremely fine adjustments with the usual type of transmission, especially when the element to be moved is heavy, because of the static friction existing between the sliding surfaces which tends to resist relative movement. Before any movement can be obtained, it is necessary to apply sufficient power to overcome the static friction, and when this occurs, the movable element has a tendency to jump ahead in its initial movement, rendering it difficult to make very fine adjustments.

It is therefore a general object of this invention to provide an improved mechanism for accurately "inching" a movable element of a machine tool.

Another object of this invention is to provide an improved apparatus for moving a machine tool element by power, whereby accurate control of small increments of movement can be maintained.

Another object is to provide a mechanism for relieving static friction between a movable element and the surface upon which it slides.

Another object is to provide an improved mechanism which will relieve the static friction between a movable element and the surface upon which it slides at the moment that power is applied to move the movable element.

Another object is to provide a pressure lubrication system for lubricating the sliding surfaces of a movable element, wherein the pressure can be increased instantaneously to deliver a sudden blow to the underside of the movable element at the moment that power movement of the movable element is initiated.

Another object is to provide a hydraulic circuit having communication with the underside of a movable element, in which a sudden increase of pressure can be effected to deliver a hammer blow to the movable element, for the purpose of relieving the static friction existing between it and the surface upon which it slides at the moment that power is applied for effecting movement of the movable element.

According to this invention, an improved feeding mechanism is provided for "inching" a movable element of a machine tool—for example, the work supporting table of a milling machine. In a typical embodiment, a pump circulates a lubricant through a circuit which has communication with the underside of the movable element to lubricate the surfaces upon which it slides. Included in the circuit is a normally open hydraulic valve which, when actuated, impedes the flow of fluid through the circuit to cause an instantaneous increase of hydraulic pressure resulting in a hammer blow being delivered to the underside of the movable element. The hammer blow functions to relieve the static friction existing between the movable element and the surfaces upon which it slides. The control element for actuating the hydraulic valve is preferably so arranged that when it is manipulated to close the valve, it also closes the electric circuit to a motor for moving the movable element so that the motor is energized and the valve is closed simultaneously. Therefore, at the moment that power feeding of the movable element is initially effected, its resistance to movement is overcome by the action of the valve, thereby permitting microfeeding of the movable element without the characteristic initial jump that ordinarily occurs when power feed is first applied. Microadjustments of the movable element by power can thereby be readily accomplished.

The invention is exemplified herein by two embodiments thereof, illustrating the use of an electrically actuated valve and a manually actuated valve for increasing the pressure in the lubricating system. However, it is to be understood that these particular embodiments are illustrative only, and that various other structural forms within the range of equivalents of the features defined in the claims may be employed in practicing the invention.

The foregoing and other objects of the invention which will become more fully apparent from the following detailed descriptions of mechanisms exemplifying the two preferred embodiments thereof, may be achieved by the apparatus described herein in connection with the accompanying drawings, in which:

Figure 1 is a fragmentary view in front elevation of a milling machine depicting the work supporting table with its supporting structure, parts of the machine frame and table having been broken away to show the internal mechanism;

Fig. 2 is a partially diagrammatic plan view of the work supporting table showing the location of the lubricant outlets along the table ways;

Figure 3:
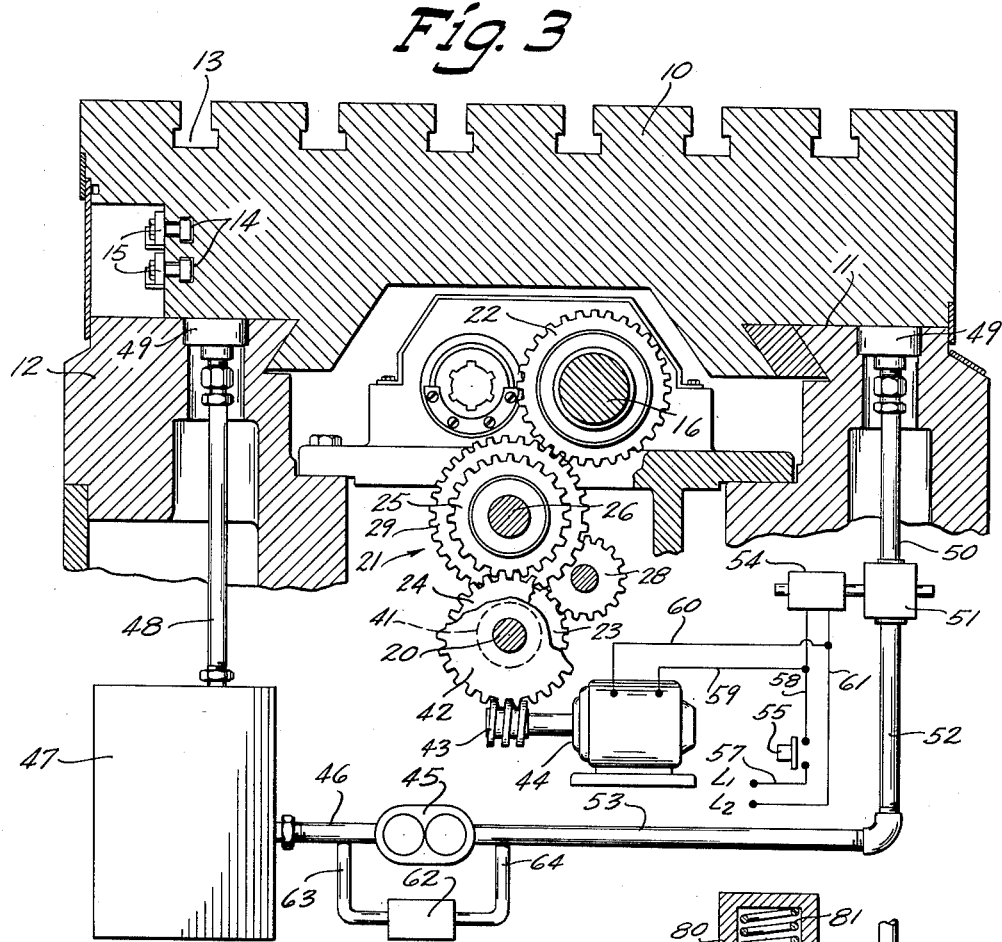
Fig. 3 is a view in vertical transverse section taken on the plane represented by the line 3—3 in Fig. 1 and showing diagrammatically the electrical and lubricating circuits; and, Fig. 4 is a fragmentary schematic diagram showing a modification of the lubricating and electrical circuits using a manually actuated pressure increasing valve.

The particular mechanism illustrated in the drawings as embodying the present invention is a bed type milling machine, the work supporting table of which is longitudinally movable. The parts of the machine not directly concerned with the invention have been omitted for the sake of clarity, the illustrations being limited to the table with its supporting structure and the related actuating mechanism.

Referring more particularly to the drawings and especially to Fig. 1 thereof, a work supporting table 10 is slidably mounted on ways 11 for reciprocatory longitudinal movement, the ways being formed in a supporting structure or base 12 of the milling machine. T-slots 13 are formed in the top of the table for receiving the usual clamping devices to clamp workpieces (not shown) to the table. Located longitudinally in the front of the table are a pair of T-slots 14 for the purpose of adjustably supporting trip dogs 15 used to effect automatic stopping of the table at any predetermined position. A table screw 16 journalled in the supporting structure 12 has threaded engagement with a nut 17 which is attached to the table 10 for moving it either manually or by power. Manual movement of the table is effected by revolving a crank handle 18 connected to the exposed end of the screw 16, a graduated dial 19 being mounted for rotation with the screw 16 to indicate the distance of travel of the table 10.

Power for moving the table originates in a transmission mechanism (not shown) from which it is transmitted by a shaft 20 to a reversing mechanism 21 and thence to a spur gear 22 keyed to the inner end of the screw 16. The reversing mechanism 21 is comprised of a pair of spur gears 23 and 24 mounted on the shaft 20, the gear 24 meshing with a complementary spur clutch gear 25 carried by a shaft 26. A spur clutch gear 27 mounted on the other end of the shaft 26 is driven by the gear 23 through an idler gear 28 for rotation in the direction opposite to that of the clutch gear 25. Disposed between the oppositely rotating clutch gears 25 and 27 on the shaft 26 is a slidable clutch gear 29 arranged to remain in constant engagement with the gear 22 on the screw 16. The gears 25 and 27 are provided with clutch teeth 30 and 31 for engagement with complementary clutch teeth 32 and 33 respectively, formed on the ends of the gear 29. The gear 29 is slidably keyed to the shaft 26 which is rotatably journalled in the base 12 of the milling machine, while the gears 25 and 27 are mounted on the shaft 26 to rotate relative to it.

A lever 37 located at the front of the machine is connected to the clutch gear 29 by a linkage (not shown) for the purpose of shifting it either to the left or to the right of the position shown in Fig. 1 to reverse the rotation of the screw 16. When the clutch gear 29 is shifted to the right, its clutch teeth 32 engage the complementary clutch teeth 30 of the gear 25, resulting in rotation of the gear 29 corresponding to the rotation of the gear 25. When rotation in the opposite direction is desired, the gear 29 is shifted to the left so that its clutch teeth 33 engage the complementary clutch teeth 31 of the gear 27 which is revolving in a direction opposite to that of the gear 25 because of its connection to the gear 23 through the idler gear 28.

Power movement of the table 10 in either direction is initiated by manipulating the lever 37 to move it either to the left or right of the vertical position, depending upon the direction of movement desired. The rate of travel of the table 10 during the feeding movement is determined by positioning a handle 38 in relation to a dial 39 of a feed rate selector mechanism 40, the rate of travel being indicated on the dial.

Included in the present invention for effecting microadjustments of the table 10, is a supplemental power source connected to the shaft 20 to drive the screw 16 through the reversing mechanism 21 at greatly reduced speed. An overrunning clutch 41 mounted on the shaft 20, carries a worm wheel 42 which has meshing engagement with a worm 43 keyed to the drive shaft of a motor 44. The overrunning clutch 41 is arranged to provide driving engagement between the worm wheel 42 and the shaft 20 only when power is transmitted from the motor 44 to the worm wheel 42 through the worm 43. When the shaft 20 is being rotated by the regular power train at feed or rapid traverse rate, the overrunning clutch 41 will not have driving engagement with the shaft 20. Such arrangement precludes turning of the motor 44 by the normal feed and rapid traverse power train when the table 10 is moving at normal rates.

The present invention is preferably incorporated with a table lubricating system which provides lubrication to the ways 11 and the complementary sliding surfaces of the table 10. As shown in Fig. 3, the system comprises a hydraulic pump 45 with driving means (not shown) arranged to pump the fluid lubricant through a tube 46 to a pressure storage tank 47. From the pressure storage tank 47, the lubricant is forced through a tube 48 to a series of outlets 49 distributed along the ways 11 as best illustrated in Fig. 2. The lubricant in the tube 48 makes a complete circuit along the ways 11 to supply the outlets 49, the remaining lubricant returning past the last outlet to a tube 50. From the tube 50, the fluid flows through a normally open solenoid actuated valve 51 to a tube 52 and a tube 53 back to the pump 45 to complete the circuit.

The valve 51 is actuated by a solenoid 54 which is energized by closing a push button switch 55 arranged to energize both the solenoid 54 and the motor 44 simultaneously when closed. Referring more particularly to Fig. 3, the electric power is obtained from a source represented by line conductors $L_1$ and $L_2$, the current leading from the line conductor $L_1$ through a conductor 57 to the switch 55. From the switch 55, the current is carried by a conductor 58 to the solenoid 54, the conductor 58 being also connected to another conductor 59 leading to one terminal of the motor 44. The circuit returns from the motor through a conductor 60 to a conductor 61 which returns from the solenoid 54 and leads back to the other line conductor L2.

When the switch 55 is closed, the electric circuit is completed to both the motor 44 and the solenoid 54 to energize both of these elements simultaneously. The solenoid 54 then functions to close the hydraulic valve 51 quickly, thereby causing a sudden surge of pressure within the lubricating system. A high pressure bypass valve 62 is provided in the circuit to permit the fluid from the pump 45 to circulate when the valve 51 is closed. Under these conditions, the fluid flows from the pump 45 into the tube 46 from which a branch conduit 63 leads to the bypass valve 62. After escaping through the bypass valve 62, the fluid flows through a tube 64 that is connected with the tube 53 and thence back to the pump 45.

The sudden closing of the valve 51 results in an instantaneous surge of pressure against the underside of the table 10 through the several outlets 49 in such a manner as to deliver a hammer blow against the table. The hammer blow functions to relieve the static friction which exists between the sliding surfaces of the table 10 and the ways 11. At the moment that this hammer blow is delivered against the table 10, the motor 44 is also energized by the action of the switch 55 to initiate a very slow movement of the table. The motor 44 may be arranged to enable steps of movement as small as one ten thousandth of an inch to be effected, which would be practically impossible to accomplish by power if the static friction tending to resist movement were not first relieved. Where the element to be moved is quite heavy, it is impracticable to inch it along minute distances without first relieving the static friction, since otherwise the power applied is first stored in the transmission until sufficient force is generated to overcome the initial resistance to movement. When sufficient force is generated, the movable element will jump ahead a greater distance than intended, rendering it impracticable to accomplish microadjustments.

Figure 4:
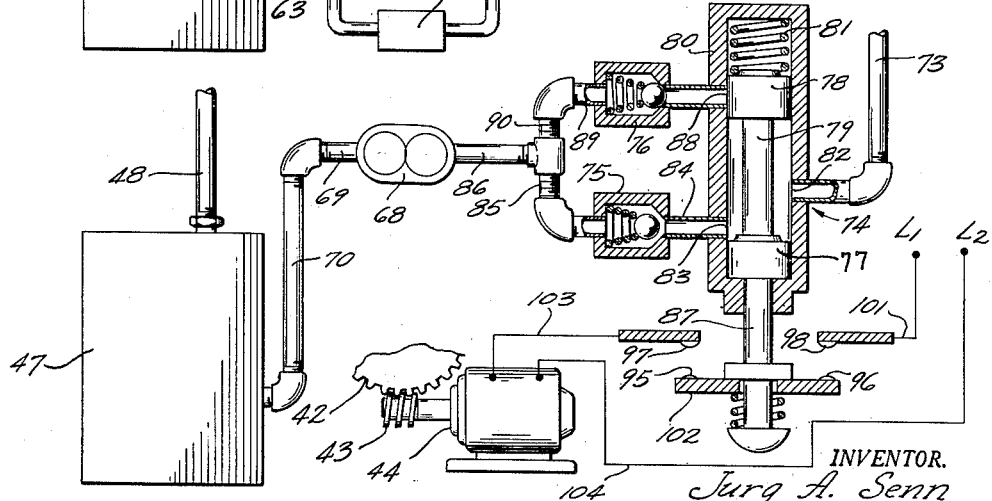

Fig. 4 illustrates an alternative embodiment of the present invention in which a modified control element is provided for increasing the pressure in the lubricating system. In this embodiment, a pump 68 pumps the lubricant into a tube 69 leading to a conduit 70, thence into the pressure storage tank 47 and out of the storage tank into the conduit 48 that leads to the outlets 49 shown in Figs. 2 and 3. The lubricant is then transmitted past the series of outlets 49 along the ways 11 and returns through a tube 73 from which it enters a selector valve 74. The valve 74 is provided to selectively direct the flow of fluid through a low pressure relief valve 75 or a high pressure relief valve 76, and is comprised of a piston 77 and a piston 78 joined by a connecting rod 79. The pistons 77 and 78 with their connecting rod 79 are enclosed in a cylindrical housing 80 and are normally retained in their lower positions as shown in Fig. 4 by a spring 81 to direct the flow of fluid from an inlet port 82 through the housing 80 into an outlet port 83 leading to the low pressure relief valve 75 through a conduit 84 and thence back to the pump 68 through conduits 85 and 86 for normal operation of the machine.

Attached to the piston 77 and protruding beyond the housing 80 is a control rod 87 provided for actuating the pistons 77 and 78 of the selector valve 74. When it is desired to deliver the hydraulic hammer blow to the table 10 the control rod 87 is manipulated to force the pistons against the pressure of the spring 81 whereby the piston 77 blocks the port 83 leading to the low pressure relief valve 75 to suddenly increase the pressure in the lubricating circuit and deliver a hydraulic hammer blow to the table 10. The piston 78 simultaneously moves beyond a port 88 to open it for communication with the inlet port 82 through the center of the valve housing 80. From the port 88, the lubricant under high pressure may escape through the high pressure relief valve 76 to flow through the conduits 89, 90 and 86 back to the pump 68. When the control rod 87 is released, the spring 81 forces the pistons 77 and 78 downward to again block the port 88 and open the port 83 to direct the flow of fluid through the low pressure relief valve 75 which will maintain a pressure within the system just sufficient to provide proper lubrication.

Carried by the control rod 87 are a pair of bridging contacts 95 and 96 located adjacent to complementary stationary contacts 97 and 98 for closing the electrical circuit to the motor 44 to start it simultaneously with actuation of the selector valve 74. Current for operating the motor is obtained from a source represented by line conductors $L_1$ and $L_2$ and flows from line conductor $L_1$ through a conductor 101 to the contact 98. When the control rod 87 is forced inward, a circuit is established to the contact 96 and through a conductor 102 to the closed contacts 95 and 97 and thence to one terminal of the motor 44 through a conductor 103. The current returns from the motor 44 through a conductor 104 leading back to the other line conductor $L_2$.

The position of the contacts 95 and 96 on the control rod 87 is so arranged that when the control rod is positioned inward, the piston 78 will move sufficiently to open the port 88 at the moment that the contacts 95 and 96 strike the contacts 97 and 98 to complete the electrical circuit. With this arrangement, the motor 44 is energized and the table 10 is jarred by the increase of pressure in the lubricating circuit simultaneously to relieve the static friction at the moment that power is applied to move the table. With this system, inching of the table 10 by power in very small increments may be accomplished.

From the foregoing descriptions and explanations of the operation of two embodiments of this invention, it is apparent that the invention has provided an improved apparatus of simple construction for effecting micro-adjustments by power of a heavy movable element which will also lubricate the sliding surfaces of the movable element and can be readily operated.

Although only two specific embodiments of the invention have been shown as illustrative of preferred apparatus operative in accordance with this invention, various other modifications may be devised by skilled mechanics in utilizing the principles herein set forth, without departing from the spirit and scope of the invention as defined in the subjoined claims.

The principles of the invention having now been fully explained in connection with the foregoing description of illustrative embodying apparatus, the invention is hereby claimed as follows:

1. In a machine tool, a set of ways, a movable element slidable on said ways, a motor connected to effect power movement of said movable element, a hydraulic circuit communicating with the bottom of said movable element, a pump connected to circulate fluid through said hydraulic circuit, a high pressure valve connected in said hydraulic circuit, a low pressure valve connected in said hydraulic circuit, a control valve connected in said hydraulic circuit and arranged to selectively control the flow of fluid through either said high pressure valve or said low pressure valve, an electrical circuit connected to transmit power to said motor, and a switch in said electrical circuit connected to control the flow of electrical current to said motor and arranged to function with said control valve, whereby the switch will be closed to energize said motor whenever said control valve is positioned to cause the fluid to flow through said high pressure valve, resulting in a surge of pressure against the bottom of said movable element whenever power movement is effected, to relieve the static friction between said movable element and said ways permitting minute movements of said movable element irrespective of its weight.

2. In a machine tool, a supporting structure, a movable element slidable on said supporting structure, a lubrication passage having communication with said movable element through openings in said supporting structure, said passage being closed except for an inlet port and an outlet port, a supply line connected to the inlet port of said passage, a pump connected to pump a lubricant into said supply line for transmission to said lubrication passage for lubricating the bearing surfaces of said movable element and its supporting structure, an exhaust line connected to said outlet port for carrying the lubricant from said passage, a normally open solenoid valve connected in said exhaust line to stop the flow of lubricant when actuated, and thus suddenly increase the pressure in said lubrication passage, a by-pass valve arranged to open when excessive pressures are generated in the system and permit the flow of lubricant through said pump without flowing through the lubrication passage, an electric motor connected to effect power movement of said movable element, a source of electric current connected to supply current for energizing said electric motor and actuating said solenoid valve, and a switch arranged to close the electric circuit to said motor and to said solenoid valve simultaneously, whereby a surge of hydraulic pressure is directed against the bottom of said movable element at the moment that power movement of said movable element is effected, to relieve the static friction opposing movement of said movable element and thereby permitting minute movements of said movable element.

3. In a machine tool, a supporting structure, a movable element slidable on said supporting structure, a closed lubricating circuit having outlets to the sliding surfaces of said movable element to lubricate them, a valve connected in said lubricating circuit after said outlets and operable to impede the flow of fluid and cause a surge of pressure within said circuit for application against said movable elements through said outlets, an electric motor connected to effect power movement of said movable element, and a control element arranged to actuate said valve and close the circuit to said electric motor simultaneously, whereby at the moment that power movement is effected a surge of pressure is applied to the underside of said movable element to overcome its initial resistance to movement.

4. In a machine tool having a movable element slidable on ways, a lubricant pressure source, a closed lubricating circuit having a line extending from said source, past said ways and returning to said source, said line adjacent said ways having communication with said ways through outlets to lubricate the surface on which said movable element slides, and a normally open valve connected in the return line of said circuit after said outlets and operable to close off the return line and thereby suddenly increase the hydraulic pressure in the forepart of said circuit when actuated to render a hammer like blow to said movable element through said outlets, whereby the static friction existing between said movable element and said ways is relieved.

5. In a machine tool having a frame presenting bearing ways, a carriage slidably mounted on said ways, power actuated mechanism operatively connected to effect power movement of said carriage, a closed lubrication conduit associated with said bearing ways, lubrication passageways leading from said conduit to said ways at spaced positions therealong, pressure exerting means connected to effect flow of lubricant through said conduit past said passageways, valve means connected in said lubrication conduit after said passageways to block escape of lubricant from said conduit and its associated passageways when closed to increase the pressure therein, and control mechanism operative to close said blocking valve and start said carriage operating mechanism simultaneously, whereby lubricant in said conduit is subjected to an hydraulic surge operating to relieve static friction between said carriage and said ways to facilitate starting said carriage.

6. In a machine tool having a frame presenting bearing ways, a carriage slidably mounted on said bearing ways, power actuated mechanism operatively connected to effect sliding movement of said carriage along said ways, a closed lubricant conduit disposed adjacent to said ways, a plurality of lubricant passages leading from said conduit to said ways at spaced positions therealong, pressure means operatively connected to effect a flow of lubricant through said conduit past said lubricant passages, and a control valve connected in the lubricant conduit after said passages and selectively operable to block said flow of lubricant suddenly in manner to cause an hydraulic surge in said conduit, thereby exerting high pressure through said lubricant passages to overcome static friction between said bearing ways and said carriage to facilitate power movement of said carriage.

7. In a machine tool, a supporting structure, ways formed in said supporting structure, a movable element slidable on said ways, a source of fluid, a closed hydraulic circuit having a line extending from said source past said ways and returning to said source, said line adjacent said ways having communication with said movable element through a plurality of outlets, a pump connected to circulate fluid from said source through said hydraulic circuit, a valve connected in the return line of said hydraulic circuit after said outlets and operable to close off the return line and thereby create a surge of pressure in the forepart of said circuit when actuated for suddenly increasing the pressure against said movable element through said outlets, means engaged to effect power movement of said movable element, and a control element connected to actuate said valve and said power movement means simultaneously, whereby at the moment that power movement is effected a hydraulic hammer like blow is rendered to said movable element to relieve static friction and permit microadjustments of said movable element to be accurately accomplished.

References Cited in the file of this patent

UNITED STATES PATENTS

| Number | Name | Date |
|---|---|---|
| 1,759,412 | Noble | May 20, 1930 |
| 2,049,394 | Johnson | July 28, 1936 |
| 2,062,250 | Moller | Nov. 24, 1936 |
| 2,354,413 | Walter | July 25, 1944 |
| 2,387,254 | Gigger | Oct. 23, 1945 |
| 2,410,038 | Arms et al. | Oct. 29, 1946 |
| 2,520,879 | Dall | Aug. 29, 1950 |

FOREIGN PATENTS

| Number | Country | Date |
|---|---|---|
| 101,292 | Great Britain | May 10, 1917 |